April 12, 1955     E. B. JOHNSON     2,706,097
APPARATUS AND METHOD OF LOWERING BODIES INTO SPACE
Filed March 15, 1954     2 Sheets-Sheet 1
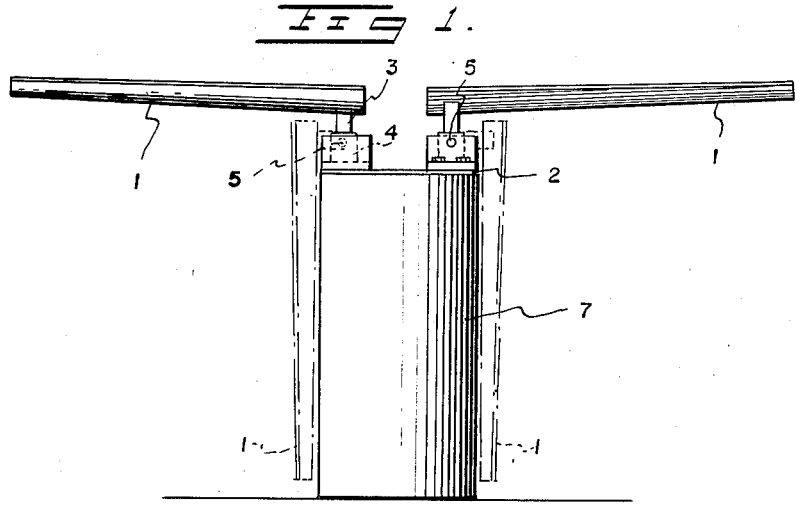
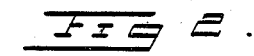
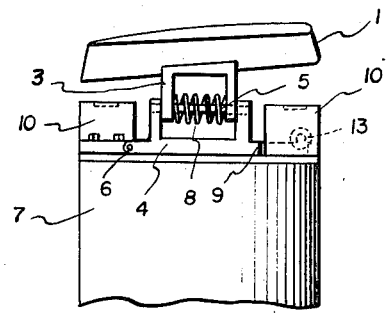
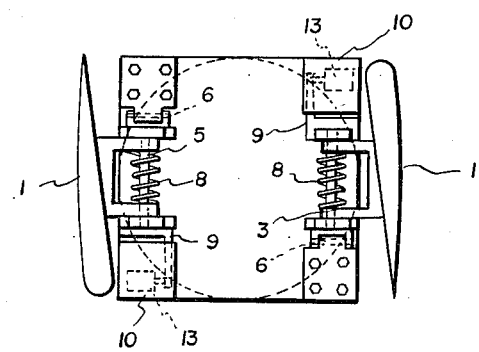
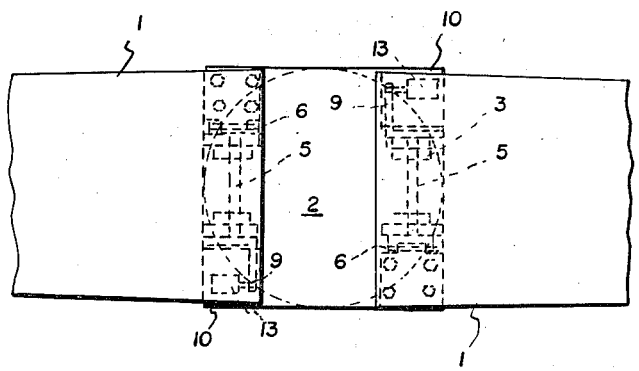
INVENTOR
EDWARD B. JOHNSON.
BY *Robert B. Harmon*
ATTORNEY

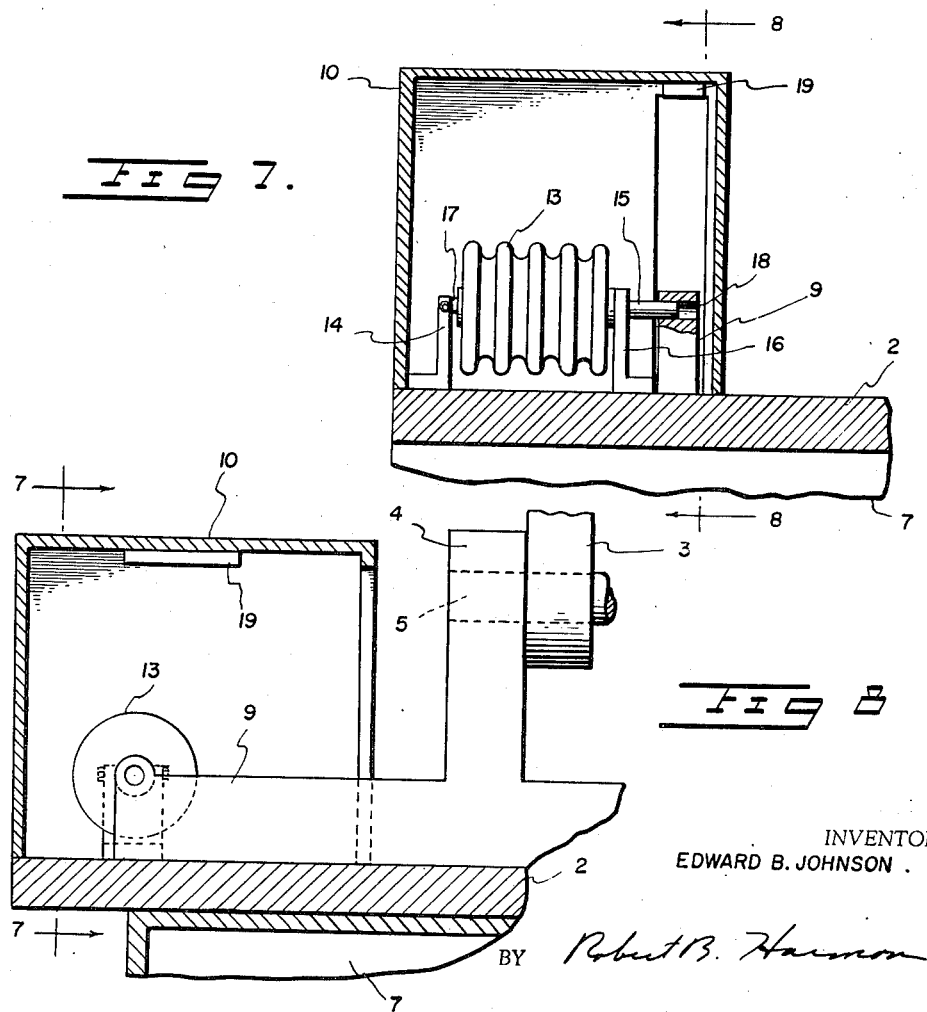

United States Patent Office 2,706,097
Patented Apr. 12, 1955

2,706,097

APPARATUS AND METHOD OF LOWERING BODIES INTO SPACE

Edward B. Johnson, Arlington, Va.

Application March 15, 1954, Serial No. 416,299

3 Claims. (Cl. 244—138)

This invention relates to lowering mechanism for bodies falling in space and to the method of rapidly decreasing the rate of fall of such bodies at a point in space proximate to the ground.

In prior practice it has been common to utilize parachutes and auto-rotational devices to slow the descent of humans and cargo dropped from aircraft to prevent injury or damage when contact is made with the ground. Such devices, however, become exceedingly large and cumbersome if the weight of the body to be dropped is large, and hence the pay load of the aircraft is correspondingly decreased by the excess of weight in the safety lowering device.

Further, the devices of prior practice are designed to lower a body at a substantially constant velocity and no additional means is provided to rapidly brake the fall of the body in the proximity of the ground to lessen the possibility of injury to the body being dropped.

It is, therefore, the primary object of this invention to provide an improved method of and apparatus for retarding the descent of bodies dropped or falling in space.

It is a specific object of this invention to provide an attachment for bodies to be dropped in space which is of smaller size relative to the weight of the body than such devices disclosed in the prior art, while at the same time maintaining or decreasing the drop velocity near the ground relative to prior art devices.

It is another object of this invention to provide an attachment for bodies to be dropped in space which will permit the rapid descent of the body to a point in space proximate to the ground and will then be active to substantially and rapidly decrease the rate of fall of the body.

A still further object of this invention is to provide an attachment for bodies to be dropped in space which will permit the relatively rapid descent of the body to a point in space proximate to the ground, at which point a timing or height sensing device will act to rapidly cause a braking of the fall of the body.

Another specific object of this invention is to provide an attachment, for bodies to be dropped in space, which includes a plurality of air-foils rotating with the body and operating to slow the descent of the body to a point in space proximate to the earth and a sensing mechanism operative to change the angle of incidence of said airfoils between the point in space and the ground to substantially and rapidly decrease the rate of descent of the falling body.

A further object of this invention is to provide an attachment for bodies to be dropped in space which is active to decrease the velocity of a body to a point in space above the earth and which, at such point, is made to actively incorporate the rotational energy of the falling body to aid in rapidly braking the fall of the body prior to impact with the earth.

Another object of this invention is to provide a method for quickly, accurately, and safely lowering bodies in space to the earth.

A still further object of this invention is to provide a method for lowering bodies in space, which utilizes the rotational energy of the falling body to decrease the rate of fall of the body prior to contact with the earth.

With the foregoing, and other objects in view, the invention resides in the following specification and appended claims, certain embodiments and details of construction of which are illustrated in the accompanying drawings, in which:

Fig. 1 is a view in front elevation of the invention attached to a typical body to be dropped into space;

Fig. 2 is a partial side elevational view of the invention illustrated by Fig. 1;

Fig. 3 is a partial plan view of Fig. 1;

Fig. 4 is a plan view of Fig. 1, with airfoils of the invention being illustrated in the retracted position;

Fig. 5 is a diagrammatic side view of an airfoil of the invention with the angle of incidence being represented as negative;

Fig. 6 is a diagrammatic side view of an airfoil of the invention with the angle of incidence being represented as positive;

Fig. 7 is a view in side elevation of a typical sensing mechanism which may be utilized with this invention; and Fig. 8 is an end view taken along the line 8—8 of Fig. 7.

Referring now more particularly to Figs. 1 to 6 inclusive, it will be noted that the invention consists primarily of a plurality of airfoils 1 (two shown in the drawing) pivotally secured to a base 2. This pivoted connection for each airfoil includes a bracket 3 secured to the foil and an extending bracket 4. A pin 5 extends through both brackets, thereby permitting the airfoil 1 to pivot about the pin in the vertical plane, as illustrated by the dotted lines of the foils in Fig. 1. The bracket 4 is itself pivotally secured to base 2 by pin 6, thereby permitting pivotal movement of the airfoils in a plane at right angles to the movement permitted about pin 5. The base 2 of the invention may be detachably secured by any suitable means (not shown) to a body 7 which is dropped from an aircraft.

For convenience of shipping and conservation of space, the airfoils 1 are normally held in the retracted position (Fig. 1 dotted lines, or Fig. 4), by means, not shown. This means could be a heavy rubber band or rope, or the like, which may be easily removed when the device is ready to be dropped from a plane. Coil springs 8, wrapped about the pivot pins 5, are utilized to assist in initially extending the airfoils 1 toward the position illustrated in Fig. 1 when the retracted position holding means (not shown) is removed. The airfoils will initially swing upwardly past the horizontal, due to wind resistance, but the spinning action and resulting centrifugal forces acting on the foils will bring them back to substantially the horizontal plane, as shown in Figure 1.

An extension 9 of bracket 4 extends into the housing 10 of a suitable sensing device which controls and limits the pivot action of bracket 4 about pin 6 and hence the angle of incidence of the airfoil connected to bracket 3. A typical sensing mechanism utilized by the invention and contained in housings 10 for each airfoil, is illustrated in Fig. 7. Such a mechanism may be a suitable timer, an altimeter, or other height sensing device.

The height sensing mechanism of Fig. 7 comprises an atmospheric pressure responsive bellows 13 fixedly supported by a projecting stud 17 at one end to a bracket 14. At the other end of the bellows 13 is an elongated stud 15 which is freely carried by a bracket 16. The end of stud 15 projects into a hole 18 provided in extension 9 of the bracket 4. Obviously, at a high altitude, the pressure bellows 13 will expand longitudinally to lock the projection 9 in its lower position, as in Fig. 7. Upon decrease in altitude, the bellows will, at any predetermined height, contract enough to remove the stud 15 from hole 18 permitting the projection 9 of bracket 4 to move up against stop 19 with the result that the airfoil angle of incidence is made positive.

As illustrated, one such sensing device is utilized with each airfoil, although it is, of course, readily apparent that one such device could be made operative to control all the airfoils of the invention.

Referring now particularly to Fig. 5, the airfoil 1 is illustrated in the auto-rotational position. The angle of incidence A is the angle measured between the cord line 10 through the airfoil and the horizontal plane represented by line 11. The vector line 12 represents the true direction and velocity of the airfoil 1. B is the angle of attack of the airfoil section and is the angle between the cord line 10 and the resultant R. C is the angle between the resultant R and the horizontal 11.

Referring now to Fig. 6, the airfoil section 1 is illustrated in the high lift position. It will now be noted that in this position, the angle of incidence of the airfoil A has been changed from negative to positive relative to the horizontal line 11. Likewise, the angle of attack B has been increased considerably relative to its size, as illustrated in Fig. 5.

In the operation of this invention then, it is the change of the angle of incidence of the airfoil at the proper height above the ground from that shown in Fig. 5 to that shown in Fig. 6, which gives the desired aerodynamic braking result.

In operation, the base 2 of the invention is secured to a body 7 to be dropped from an aircraft. Once the body 7 is cast into space, the airfoils 1 will be moved upwardly about pivot pin 5 by springs 8 to the position illustrated in Figs. 1 and 3, and by air acting on the airfoils. The airfoils 1 are then in the position of Fig. 5 with a negative angle of incidence. Automatic rotation of the body 7 with the airfoils 1 commences. In this position, the body and airfoils accelerate until constant linear and angular velocities are reached. Prior to contact with the ground, the height sensing or timing mechanism in housings 10 become active to permit the brackets 4 to pivot a limited amount about pivot pins 6. Hence the airfoils 1 are likewise moved to the position of Fig. 6. This is the high lift position of the airfoils 1. The high lift acts on the body 7 during the remainder of the fall to the earth and greatly and suddenly decreases the linear velocity of the body. The effectiveness of this braking action is due primarily to the fact that the falling body stores up, in falling, a great deal of rotational energy which is not fully utilized in slowing the fall until the angle of incidence of the airfoil is changed from negative to positive. Devices in the prior art for varying the angle of incidence of the airfoil during descent, have not utilized the concept of rotating the falling body by the airfoils and then incorporating the energy of the rotating body to drive the airfoil to effect, with a positive angle of incidence, a substantial aerodynamic braking action.

It is, therefore, apparent that this invention provides a substantial improvement over the prior art in the safety lowering of bodies falling in space, both in method of performance and the apparatus necessary to obtain such performance.

I claim:

1. A safety lowering mechanism for bodies to be dropped into space from aircraft comprising a base to be secured to the body being dropped, a plurality of airfoils secured by mounting means to the base to rotate the body during the fall, said mounting means including a bracket secured to each airfoil and hingedly connected to the base for limited movement relative thereto between two limiting positions, whereby either a negative or positive angle of incidence setting of the airfoil is obtained in one or the other of the two positions, means retaining each bracket in the position determining a negative angle of incidence for the airfoil and sensing means for releasing said retaining means whereby to permit each airfoil to move to the position giving it a positive angle of incidence at a point proximate to the earth to effect a substantial braking action on the body.

2. A safety lowering mechanism for bodies to be dropped into space from aircraft comprising a base to be secured to the body being dropped, a plurality of airfoils, means to pivotally secure each airfoil to the base, said securing means permitting movement of the airfoil from a position substantially parallel to the longitudinal axis of the body to a position substantially normal to the axis of the body and further permitting limited movement of the airfoil in a plane at right angles to the plane of the aforesaid movement between two positions whereby either a negative or positive angle of incidence setting of the airfoil is obtained in one or the other of the two positions, means to retain each securing means in the position determining a negative angle of incidence for the airfoil, and sensing means for releasing said retaining means, whereby to permit each airfoil to move to the position giving it a positive angle of incidence at a point proximate to the earth to effect a substantial braking action on the body.

3. A safety lowering mechanism for bodies to be dropped into space from aircraft comprising a base to be secured to the body being dropped, a plurality of airfoils, means to pivotally secure each airfoil to the base, said securing means permitting movement of the airfoil from a position substantially parallel to the longitudinal axis of the body to a position substantially normal to the axis of the body and further permitting limited movement of the airfoil in a plane at right angles to the plane of the aforesaid movement between two positions whereby either a negative or positive angle of incidence setting of the airfoil is obtained in one or the other of the two positions, and pressure responsive bellows means for retaining said securing means in the position determining a negative angle of incidence for the airfoil and for releasing said securing means to permit movement of the said securing means to the position giving the airfoil secured thereto a positive angle of incidence at a point proximate to the earth in response to increasing atmospheric pressure acting on said bellows means to effect a substantial braking action on the body.

References Cited in the file of this patent

UNITED STATES PATENTS

| | | |
|---|---|---|
| 1,880,586 | Tiling | Oct. 4, 1932 |
| 1,919,089 | Breguet | July 18, 1933 |
| 2,440,293 | Stanley | Apr. 27, 1948 |

FOREIGN PATENTS

| | | |
|---|---|---|
| 129,017 | Great Britain | July 10, 1919 |